Figure 1:
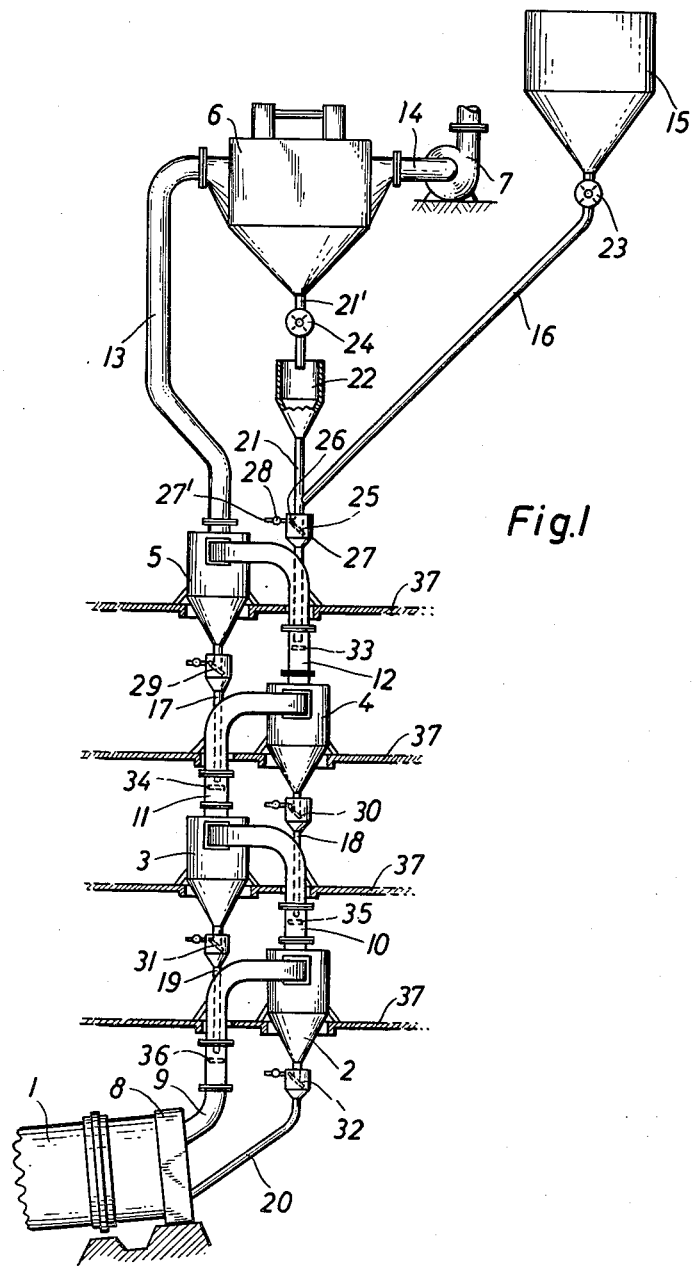

June 5, 1962 H. DEUSSNER 3,037,757
APPARATUS FOR HEATING FINE GRANULAR SUBSTANCES
Filed July 30, 1959 2 Sheets-Sheet 1

INVENTOR
Herbert Deussner

June 5, 1962   H. DEUSSNER   3,037,757
APPARATUS FOR HEATING FINE GRANULAR SUBSTANCES
Filed July 30, 1959   2 Sheets-Sheet 2

INVENTOR
Herbert Deussner

United States Patent Office 3,037,757
Patented June 5, 1962

3,037,757
APPARATUS FOR HEATING FINE GRANULAR SUBSTANCES
Herbert Deussner, Koln-Dellbruck, Germany, assignor to Klockner-Humboldt-Deutz Aktiengesellschaft, Koln-Deutz, Germany, a corporation of Germany
Filed July 30, 1959, Ser. No. 830,681
Claims priority, application Germany Aug. 1, 1958
8 Claims. (Cl. 263—32)

My invention relates to apparatus for heating solid fine-granular substances, particularly cement raw material.

A known aparatus for heating cement raw material comprises a number of serially connected cyclone separators sequentially traversed by the exit gases of a rotary kiln. The substance to be heated is introduced into a gas conduit interconnecting two serially adjacent ones of the cyclone separator. The dust discharge pipe of the lowermost, first cyclone separator leads directly into the kiln. The dust discharge pipes of each other cycle separator extend into the gas conduit leading to the next preceding cyclone separator. However, the dust discharge pipe of the last or uppermost cyclone separator may pass the material directly into the kiln.

The exit gases of the rotary kiln enter into such a heating apparatus at a temperature of about 1000° C. It is necessary, therefore, to suitably compensate the thermal expansion of the cylone separators and gas conduits in order to prevent cracks or fractures of the structural components to be caused by non-compensated expansion forces. This has heretofore been done by interposing particular compensators, designed and operating like stuffing boxes, in the individual gas conduits between the cyclone separators.

Relating to heating apparatus of the type described above, it is an object of my invention to simplify the equipment by eliminating the need for stuffing-box compensators.

This is achieved, according to the invention, by connecting each gas conduit between two serially adjacent cyclone separators rigidly with the one cyclone separator next preceding, and giving the top wall of that cyclone separator a yieldable design of such elasticity that the top can follow the thermal expansion of the cyclone separator structure as well as the expansion of the connecting gas conduit.

In accordance with another, more specific feature of my invention, each gas conduit is fastened near its outlet end to a platform of the mounting frame or building that accommodates the cyclone separators, and is given such a length that the cyclone separator top, in cold condition, bulges outwardly a distance equal to approximately one half the length of thermal expansion under normal operating conditions.

According to another, more specific feature of the invention, a short intermediate conduit piece is welded to the top of each cyclone separator, and the adjacent gas conduit is fastened to the intermediate piece by means of flanges and screw bolts.

In a heating apparatus according to the invention, the elastic deflection of the top or ceiling structure of each cyclone separator absorbs the thermal expansion of cyclone separator and gas conduit by permitting the gas conduit and the main structure of the cyclone separator to become displaced under thermal forces without requiring any particular compensators.

The invention will be more fully understood from the following description in conjunction with the drawings, showing, by way of example, an embodiment of heating apparatus according to the invention.

Figure 2:
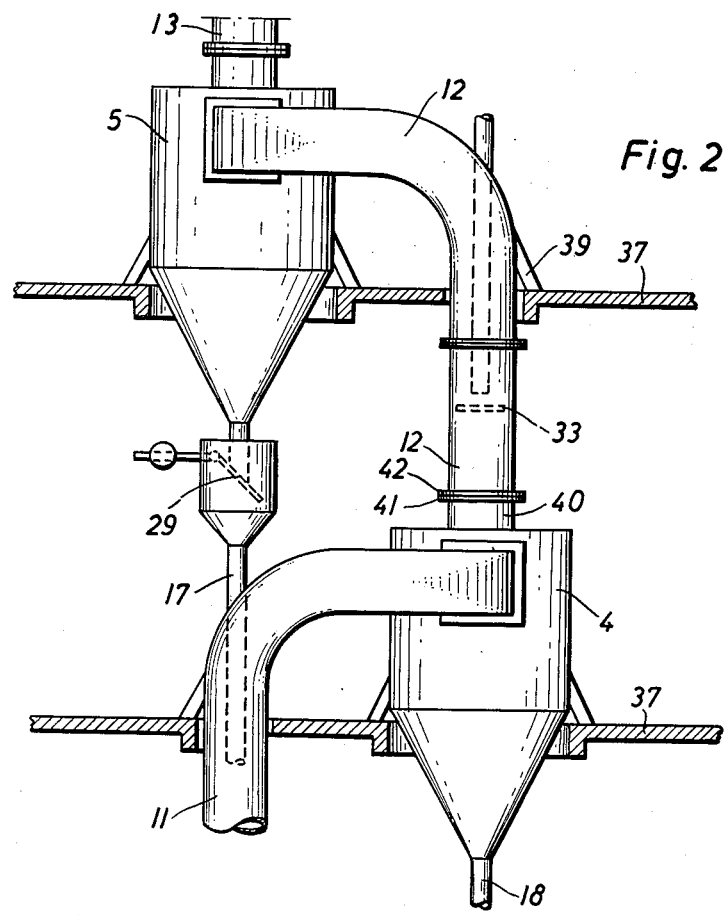
Figure 3:
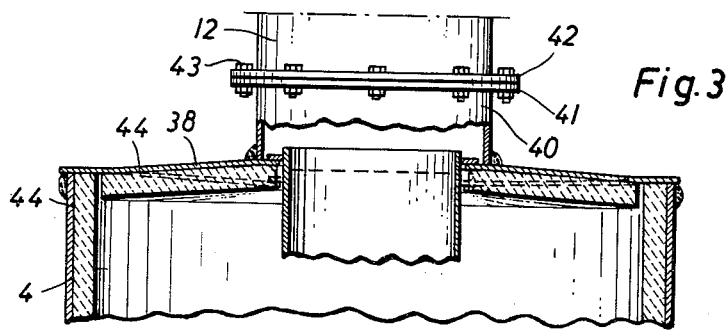

FIG. 1 is a front view of the complete heating plant.
FIG. 2 shows part of the plant on larger scale; and
FIG. 3 illustrates, partly in section, the top portion and adjacent conduit structure of one of the cyclone separators.

The heating apparatus illustrated in FIG. 1 comprises a rotary kiln 1, four cyclone separators 2, 3, 4 and 5, an electric dust separator 6, an exhaust blower 7, and a number of gas conduits and dust discharge conduits which interconnect the individual main components. The cyclone separators as well as the gas conduits are securely mounted on platforms 37 of the building in which the heating apparatus is accommodated. The heating gases pass from the stationary hood 8 of the kiln 1 through a gas conduit 9 into the cyclone separator 2, thence through another gas conduit 10 into the cyclone separator 3. From cyclone separator 3, the gases pass through a conduit 11 into the cyclone separator 4, and then through the conduit 12 into the cyclone separator 5. Thereafter, the gases pass through a conduit 13 into the electric dust precipitator 6. From precipitator 6, the gases are exhausted through a conduit 14 and the blower 7 into a chimney (not illustrated) from which they pass into the free atmosphere.

The granular material to be heated is charged into a hopper 15 from which it passes through a pipe line 16 into the gas conduit 12 leading from the gas outlet opening of cyclone separator 4 to the gas inlet opening of cyclone separator 5. The fine-granular material is preheated in cyclone separator 5 by intimate contact with the whirling gas before it is separated from the gas. The solid material then drains through a dust-discharge pipe 17 into the gas conduit 11 connecting the gas outlet of cyclone separator 3 with the inlet of cyclone separator 4. In cyclone separator 4, the material is further heated in intimate contact with the whirling current of hot gases and, after being centrifugally separated from the gas, will drain through the dust-discharge pipe 18 into the gas conduit 10 leading from cyclone separator 2 to cyclone separator 3. The fine-granular material is further heated in cyclone separator 3 and is then separated from the gas current. Thereafter, the separated solid material passes through the dust-discharge pipe 19 into the gas conduit 9 connecting the kiln with the first cyclone separator 2. The solid material separated in cyclone separator 2 is discharged through dust pipe 20 and passes in hot condition into the kiln 1.

The finest dust which is not separated in the cyclone separators but is entrained by the gas into the electric precipitator 6 is separated from the relatively cool gas and is supplied through a dust-discharge pipe 21 into the pipe leading from the hopper 15 to the gas conduit 12. The dust line 21 is preferably interrupted by an intermediate hopper 22 which secures a uniform supply of the dust into the feed line 16 even though the dust discharge from the electric dust separator 6 is not continuous but periodic.

The heating apparatus further comprises the following auxiliary devices. Disposed in the feed line 16 extending from the hopper 15 is a cell wheel 23 which is driven at uniform speed of rotation in order to feed a given quantity of material per time unit from hopper 15 into the line 16. Another cell wheel 24 is inserted into the dust-discharge line 21' of the separator 6. The cell wheel 24 provides a gas-tight seal for the discharge pipe 21 and supplies the dust from the separator 6 into the intermediate hopper 22 in uniform quantity per unit of time.

For sealing the dust-discharge line 21 beneath the intermediate hopper 22 and preventing the escape of heating gases through the intermediate hopper, the apparatus is further equipped with a sealing device according to U.S. Patent No. 2,648,532. As more fully described in the patent, the line 21 is interrupted above the location where it enters into the gas conduit 12. The upper portion of the dust pipe 21 has a slanted opening closed by a flap 25. The flap can turn on a pivot shaft 26 mounted in the wall of a housing 27 enclosing the flap 25. Mounted on pivot shaft 26 outside of housing 27 is an arm 27' which carries a displaceable weight 28. The weight presses the flap against the slanted opening of the pipe 21. Similar closure flaps 29, 30, 31 and 32 are provided in the dust-discharge lines 17, 18, 19 and 20. Located a short distance beneath the outlet ends of dust pipes 17, 18, 19 and 20 are circular baffle disks 33, 34, 35 and 36 respectively. These disks likewise form a dust seal and prevent the gas from escaping through the dust-discharge pipes.

The two cyclone separators 4 and 5 are separately illustrated in FIG. 2. As described, the cyclone separators are rigidly mounted on respective platforms 37 and are connected with each other by the gas conduit structure 12—40. The lower end portion 40 of the conduit structure is rigidly welded to the sheet-metal top 38 of the cyclone separator 4. The side walls and top of the cyclone separator 4 are provided with refractory linings 44, as is apparent from FIG. 3. However, the lining beneath the top sheet 38 of the cyclone separator is kept separate from the lining on the adjacent cylindrical wall. As a result, the cyclone separator top of sheet metal is sufficiently elastic to be subjected to bending deformation, and the lining 44 of the top can participate in such deformation without being damaged.

The top portion of the gas conduit 12 extends tangential to the cylindrical wall of the cyclone separator 5. The conduit is securely attached to, and supported by, the platform 37 by means of struts 39.

By virtue of the above-described design, the cyclone separator top 38, to which the gas conduit 12 is welded, is sufficiently elastic to be capable of yielding to thermal expansion of the cyclone separator 4 and of the gas conduit 12. With increasing thermal expansion, the top 38 bulges downwardly and inwardly as is illustrated by broken lines in FIG. 3, the spacing between top lining 44 and lattice lining 44 being sufficient to prevent crusting of the lining material. To make certain that the cyclone separator top 38, which is planar in original condition, is not thermally deflected excessively in the downward direction, it is preferable to pre-tension the cyclone separator top in cold condition so that, when the plant is inactive, the top bulges outwardly and upwardly a distance approximately equal to one half of the distance of thermal expansion expected during normal plant operation.

In order to facilitate such pre-tensioning, it is advantageous to provide between the conduit 12 proper and the cyclone separator top 38 a short intermediate conduit piece 40 with a top flange 41 as shown in FIG. 3. The proper axial length of the intermediate piece 40, which is preferably determined when the apparatus is being assembled and installed, depends upon the spacing of the connecting flange 42 on conduit 12 from the still planar cyclone separator top 38 minus the desired pre-tensioning distance and the thickness of a seal, for example an asbestos gasket to be inserted between the two flanges 41 and 42. When assembling the plant, the intermediate piece 40, after being cut to proper axial length, is placed upon the cyclone separator top 38 and then welded thereto. As a result, there remains between the two flanges 41 and 42 a gap whose width is equal to the sum of the desired pre-tensioning distance and the thickness of the gasket. The connecting bolts 43 of the two flanges 41 and 42 are made long enough to pass through both flanges in the just-mentioned condition. When tightening the screw bolts, the gasket is clamped between the two flanges and the cyclone separator top 38 is elastically forced outwardly and thus pre-tensioned. Since the upwardly extending gas conduit 12 is mounted upon the upper platform 37, the conduit is capable of absorbing the pre-tensioning forces.

When during subsequent starting-up of the completed plant, the gas conduit 12 and the wall of cyclone separator 4, for example, become heated to the highest uniform operating temperature, both components will expand to such an extent that ultimately the cyclone separator top 38 may assume the position shown by broken lines in FIG. 3. The same applies to the other cyclone separators and gas conduits of the plant.

It will be apparent, therefore, that the present invention affords a structurally very simple way of providing for good compensation of thermal expansion without the need for displaceable sealing devices, stuffing boxes or the like accessories.

I claim:

1. Apparatus for heating solid granular substances, comprising a series of cyclone separators each having an inlet opening, a top with a gas outlet opening, and each having a dust-discharge pipe, two gas conduits connected respectively to the inlet opening of the first cyclone separator and to the outlet opening of the last cyclone separator of said series, and at least one intermediate gas conduit connecting the outlet opening of a preceding cyclone separator with the inlet of the serially next cyclone separator, said dust-discharge pipe of each cyclone separator, with the exception of that of said first cyclone separator, opening into the gas conduit leading to the inlet opening of the next preceding cyclone separator of the series, means for mounting said cyclone separators in fixed relation to each other, said intermediate conduit being rigidly joined with the top of the serially next preceding cyclone separator, and the top of said latter cyclone separator being constituted of elastically yieldable sheet metal to follow the thermal expansion of said cyclone separator and said gas conduit, said top being fixed to said latter cyclone separator, said sheet-metal top being pre-tensioned in the cold under a force acting outwardly of the latter cyclone separator.

2. Apparatus for heating solid granular substances, comprising a series of cyclone separators each having an inlet opening, a top with a gas outlet opening and each having a dust-discharge pipe, two gas conduits connected respectively to the inlet opening of the first cyclone separator and to the outlet opening of the last cyclone separator of said series, and at least one intermediate gas conduit rigidly mounted and connecting the outlet opening of a preceding cyclone separator with the inlet of the serially next cyclone separator, said dust-discharge pipe of each cyclone separator, with the exception of that of said first cyclone separator, opening into the gas conduit leading to the inlet opening of the next preceding cyclone separator of the series, means for mounting said cyclone separators in fixed relation to each other, said intermediate conduit rigidly joined with the top of the serially next preceding cyclone separator, and the top of said latter cyclone separator being constituted of elastically yieldable sheet metal to follow the thermal expansion of said cyclone separator and said gas conduit, said top being fixed to said latter cyclone separator, said sheet metal top being pre-tensioned in the cold under a force acting outwardly of the latter cyclone separator to bulge the top outwardly.

3. Apparatus for heating solid fine-granular substances, comprising a series of cyclone separators each having an inlet opening, a top with a gas outlet opening, and each having a dust-discharge pipe, two gas conduits connected respectively to the inlet opening of the first cyclone separator and to the outlet opening of the last cyclone separator of said series, and at least one intermediate gas conduit connecting the outlet opening of a preceding cyclone separator with the inlet of the serially next cyclone separator, said dust-discharge pipe of each cyclone separator, with the exception of that of said first cyclone separator, opening into the gas conduit leading to the inlet opening of the next preceding cyclone separator of the series, said intermediate conduit being rigidly joined with the top of the serially next preceding cyclone separator, and the top of said latter cyclone separator being constituted of elastically yieldable sheet metal to follow the thermal expansion of said cyclone separator and said gas conduit, said top being fixed to said latter cyclone separator, said sheet-metal top being pre-tensioned in the cold under a force acting outwardly of said cyclone separator, said intermediate conduit including at least two sections, one of said sections being rigidly connected to said sheet-metal top and being shorter than the other, support means for rigidly holding the other section, means for rigidly connecting the two sections, the latter means including tightening means which serves to pre-tension said sheet-metal top, said means for rigidly connecting the two sections comprising juxtaposable coupling flanges on the respective adjacent ends of the sections, said tightening means comprising fastening means for securing the flanges together and serving to pull the shorter section, and also the said sheet-metal top rigidly attached thereto, in a direction outward of the said preceding cyclone separator to pre-tension said metal top, as aforesaid.

4. Apparatus for heating solid granular substances, comprising a series of cyclone separators each having an inlet opening, a top with a gas outlet opening, and each having a dust-discharge pipe, two gas conduits connected respectively to the inlet opening of the first cyclone separator and to the outlet opening of the last cyclone separator of said series, and at least one intermediate gas conduit connecting the outlet opening of a preceding cyclone separator with the inlet of the serially next cyclone separator, said dust-discharge pipe of each cyclone separator, with the exception of that of said first cyclone separator, opening into the gas conduit leading to the inlet opening of the next preceding cyclone separator of the series, said intermediate conduit being rigidly joined with the top of the serially next preceding cyclone separator, and the top of said latter cyclone separator being constituted of elastically yieldable sheet metal to follow the thermal expansion of said cyclone separator and said gas conduit, said top being fixed to said latter cylone separator, said sheet-metal top being pre-tensioned under an outwardly directed force, said intermediate conduit including at least two sections, one of the sections being rigidly connected to said sheet-metal top and being shorter than the other, support means for rigidly holding the other section, means for rigidly connecting the two sections, the latter means including tightening means which serves to pretension said sheet-metal top, said means for rigidly connecting the two sections comprising juxtaposable coupling flanges on the respective adjacent ends of the sections, said tightening means comprising fastening means for securing the flanges together and serving to pull the shorter section, and also the said sheet-metal top rigidly attached thereto, in a direction outward of the said preceding cyclone separator to pre-tension said metal top, as aforesaid.

5. Apparatus for contacting a gas with a solid granular substance, comprising two dust separators connected so that the gas flows from a first one thereof to the second one thereof, each separator having an inlet opening, a top with a gas outlet opening, and having a dust-discharge pipe, two gas conduits connected respectively to the inlet opening of the first separator and to the outlet opening of the second separator, and an intermediate gas conduit connecting the gas outlet opening of the first separator with the inlet of the second separator, means for mounting said cyclone separators in fixed relation to each other, said intermediate conduit being rigidly joined with the top of the first separator, and the top of said latter separator being constituted of elastically yieldable sheet metal to follow the thermal expansion of said separator and said gas conduit, said top being fixed to said latter separator, said sheet-metal top being pre-tensioned in the cold under an outwardly acting force, the sheet-metal top having affixed thereto an inner refractory lining, the inner side walls of said preceding separator having an inner refractory lining, the periphery of the lining of the sheet-metal top being inwardly offset from the side wall lining at least a sufficient distance to permit deformation, by thermal expansion, of the sheet-metal top, and consequent movement of its lining, without interference between said linings.

6. Apparatus for heating solid fine-granular substances, comprising a series of cyclone separators each having an inlet opening, a top with a gas outlet opening and each having a dust-discharge pipe, two gas conduits connected respectively to the inlet opening of the first cyclone separator and to the outlet opening of the last cyclone separator of said series, and at least one intermediate gas conduit connecting the outlet opening of a preceding cyclone separator with the inlet of the serially next cyclone separator, a material feed pipe entering into the gas conduit leading to the inlet opening of said last cyclone separator, said dust-discharge pipe of each cyclone separator, with the exception of that of said first cyclone separator, opening into the gas conduit leading to the inlet opening of the next preceding cyclone separator of the series, said intermediate conduit being rigidly joined with the top of the serially next preceding cyclone separator, and the top of said latter cyclone separator being constituted of elastically yieldable sheet metal to follow the thermal expansion of said cyclone separator and said gas conduit, said top being fixed to said latter cyclone separator, and stationary means for supporting said cyclone separators in fixed relation to each other.

7. Apparatus for heating solid fine-granular substances, comprising a series of cyclone separators each having an inlet opening, a top with a gas outlet opening and each having a dust-discharge pipe, two gas conduits connected respectively to the inlet opening of the first cyclone separator and to the outlet opening of the last cyclone separator of said series, and at least one intermediate gas conduit connecting the outlet opening of a preceding cyclone separator with the inlet of the serially next cyclone separator, a material feed pipe entering into the gas conduit leading to the inlet conduit opening of said last cyclone separator, said dust-discharge pipe of each cyclone separator, with the exception of that of said first cyclone separator, opening into the gas conduit leading to the inlet opening of the next preceding cyclone separator, and the top of said latter cyclone separator being constituted of elastically yieldable sheet metal to follow the thermal expansion of said cyclone separator and said gas conduit, said top being fixed to said latter cyclone separator, said apparatus further comprising a building structure having rigid supporting platforms on which said respective cyclone separators are mounted above one another, each of said intermediate gas conduits being rigidly attached to one of said platforms near the outlet end of the conduit and having an axial length adapted to have said cyclone separator top bulge outwardly when in cold condition a distance approximately equal to one half of the amount of thermal expansion obtaining at the normal operating temperature.

8. An apparatus for contacting a solid granular substance with a gas, in mutually counter-current flow, said apparatus being subject to thermal stresses, comprising two granular substance separators connected so that the gas flows from a first one of said separators to the second one thereof, means for mounting the separators in fixed relation to each other, each separator having a discharge pipe for the separated granular substance, a gas inlet conduit for the first separator, the granular substance discharge pipe of the second separator being connected to discharge into the gas inlet of the first separator, the first separator having a top closure member fixed thereto, and a top gas outlet opening in said top member, the second separator having a gas inlet opening, an intermediate conduit structure connecting the gas outlet opening of the first separator to the gas inlet opening of the second separator, said intermediate conduit structure being rigidly joined with the said top closure member of the first separator, said closure member being constituted of elastically yieldable sheet metal adapted to flex, to follow the thermal expansion of said separator and said gas conduit, means operatively connected to said intermediate conduit structure to pre-tension said top closure member in the cold under an outwardly acting force, said closure member being adapted to bulge inwardly, under thermal expansion.

References Cited in the file of this patent

UNITED STATES PATENTS

| | | |
|---|---|---|
| 729,006 | Sutton et al. | May 26, 1903 |
| 2,374,606 | McCollum | Apr. 24, 1945 |
| 2,797,077 | Muller | June 25, 1957 |
| 2,863,654 | Beal et al. | Dec. 9, 1958 |

FOREIGN PATENTS

| | | |
|---|---|---|
| 519,999 | Great Britain | Apr. 11, 1940 |
| 650,259 | France | Jan. 7, 1929 |